July 27, 1943.   M. H. AXLER ET AL   2,325,463
CAMERA
Filed Dec. 13, 1939   2 Sheets-Sheet 1
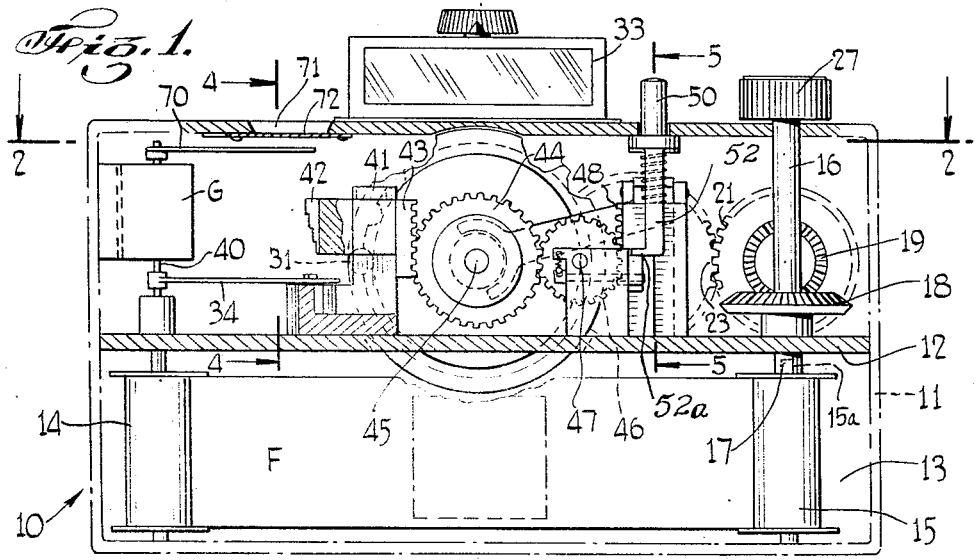
INVENTORS
MEYER H. AXLER
EDWARD HALITSKY
BY
ATTORNEY

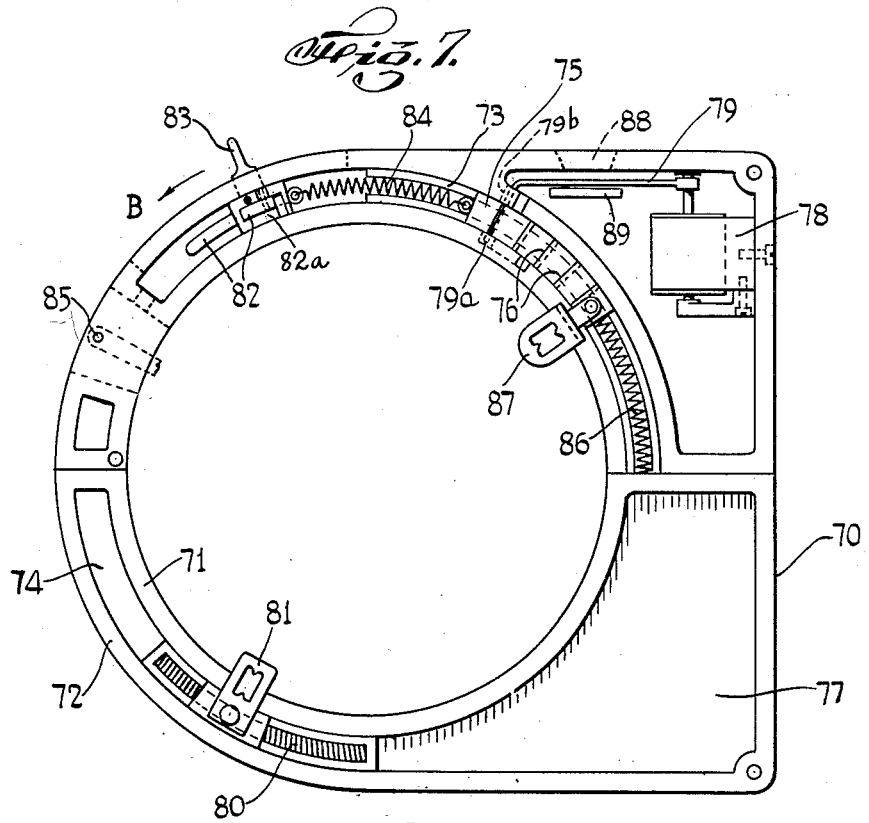
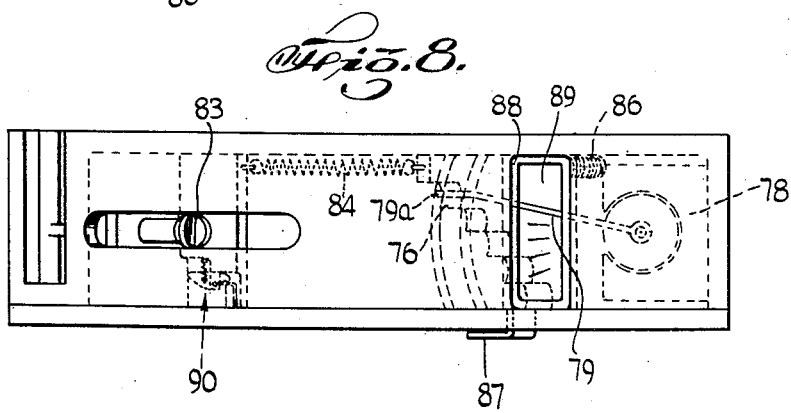

Patented July 27, 1943

2,325,463

UNITED STATES PATENT OFFICE 2,325,463

CAMERA

Meyer H. Axler, Bronx, N. Y., and Edward Halitsky, Santa Monica, Calif.

Application December 13, 1939, Serial No. 308,908

21 Claims. (Cl. 95—10)

This invention relates to photographic cameras. More particularly, our invention relates to an improved construction for a combined camera and light sensitive control device.

One of the objects of our invention is to provide a camera having improved and novel means for automatically controlling the shutter speed by light sensitive means, and which shall be so constructed and arranged that it may be built into the camera, or which may be made up into a separate unit for attachment to standard types of cameras.

Another object of our invention is to provide novel and improved light sensitive camera control means of the character described which shall be characterized by its simplicity of operation and manufacture and which shall possess a high degree of usefulness and efficiency in operation.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention, Fig. 1 is a vertical sectional view of a combined camera and light sensitive control device constructed in accordance with our invention, but showing only a portion of the casing construction;

Fig. 2 is a cross-sectional view taken substantially on the line 2—2 of Fig. 1;

Fig. 3 is a front elevational view of a portion of the apparatus shown in Fig. 2;

Fig. 4 is a cross-sectional view taken substantially on the line 4—4 of Fig. 1;

Fig. 5 is a cross-sectional view taken substantially on the line 5—5 of Fig. 1;

Fig. 6 is a schematic wiring diagram illustrating the operation of our invention;

Fig. 7 is a front elevational view of a modified form of our invention adapted to be employed as an auxiliary unit for cameras; and Fig. 8 is a top plan view thereof.

Referring now in detail to the drawings, there is shown in Figs. 1 to 6 a camera 10 which may be of any known standard make comprising generally a suitable casing 11 having a dividing wall 12 to provide a film spool chamber 13 rotatably housing the spools 14 and 15 of standard construction. The camera 10 may be of the type in which the action of advancing of the film F to the next picture-taking position may be utilized to wind a shutter actuating spring. To this end, there is provided a shaft 16 journalled in the casing 11 and wall 12. The said shaft 16 carries a suitable clutch portion 17 designed to cause simultaneous rotation of the shaft 15a of the spool 15 with the rotation of the said shaft 16. Mounted on the shaft 16 for rotation therewith is a bevel gear 18 which meshes with the bevel gear 19 mounted on the shaft 20 for rotation therewith, the said shaft 20 being journalled in the camera casing 11. Mounted on the shaft 20 for rotation therewith is a gear 21 which meshes with an idler gear 22 mounted on the shaft 23, which in turn is fixed to the casing 11. A gear 24 mounted on the main driving shaft 25 journalled in the casing 11 meshes with the idler gear 22. The said shaft 25 is adapted to drive any suitable standard shutter, whether of the focal plane type or any other type (not shown) which may be employed for any particular camera. Said shutter, for example, may be operatively connected to the members 30 and 60 and be of the type shown in Patent No. 1,047,508 to Dickson, issued December 17, 1912. The gear 24 is provided with an integral hub 24a adapted for use as a drum for spring 26, one end of which is fixed to the said drum 24a, while the other end thereof is fixed to one part 30 of a clutch member soon to be described.

It is thus seen from the above described construction that when the shaft 16 is rotated to advance the film F, the spring 26 will be wound by means of the chain of gears 18, 19, 21, 22 and 24. A winding knob 27 is fixed to the shaft 16 to facilitate the manual operation of the spring winding and film advancing mechanism.

The spring 26 is held against unwinding to actuate the clutch part 30 by a spring pressed pin member 31 which is disposed in the path of an extension 32 on the periphery of the clutch part 30. When the spring is thus wound, the mechanism of the camera may be so designed that the shutter will be cocked and in readiness for operation by an operating button on the camera casing in the manner well known to the art.

Mounted on the camera casing is a light sensitive device 33 which may be of any standard design employed for camera shutter meters and, as shown in Fig. 6 of the drawings, forms part of a circuit including a galvanometer G having the pointer 34, a resistance coil 35 cooperating with a sliding contact 36, and a second film speed resistance coil 37. Said second resistance coil 37 is provided with a plurality of taps, as clearly shown in Fig. 6, which are adapted to cooperate with a switch 37a to insert a resistance in the circuit which corresponds to the speed of the film emulsion employed in the camera 10.

The resistance coil 35 may be mounted in the diaphragm housing 38 and the said diaphragm housing 38 may also carry the customary indicia representing the diaphragm openings together with a pointer member 39 for manually setting the diaphragm opening in the customary manner. The pointer member 39 is attached to the sliding contact 36 which cooperates with the resistance coil 35 so that, as the said pointer 39 is manually moved to any selected diaphragm opening, the sliding contact 36 will make contact with the resistance 35 to permit the proportionate amount of energy generated by the light cell 33 to enter the galvanometer G. The galvanometer G is attached to a wall of the casing 11 within the camera and may be of the usual standard construction and provided with a pointer 34 adapted to pivot about the shaft 40 in response to the energy generated by the light sensitive device 33.

The following mechanism is employed for automatically setting the shutter speed of the camera in relation to the selected diaphragm opening and with respect to the light conditions as picked up by the light sensitive device 33. Slidably mounted for vertical movement on a support 41 is a stepped member 42 of arcuate shape as shown in Figs. 1, 2 and 4. Attached to the stepped member 42 for movement therewith is a gear rack 43 adapted to mesh with a gear 44 which is mounted on the shaft 45 for rotation therewith, the said shaft 45 being journalled in the casing 11. The gear 44 meshes with an idler gear 46 mounted on the shaft 47, the said shaft 47 being supported by the bracket 47a. In mesh with the gear 46 is a second rack 48 actuated through a spring 49 by a camera operating button 50 which projects through the casing 11 of the camera, as shown in Fig. 1.

It is thus seen from the above described construction that when the button 50 is pushed downwardly, the rack 48 will cause the idler gear 46 to turn the gear 44, which in turn will actuate the rack 43 to cause the stepped member 42 to move downwardly. The distance of downward travel of the stepped member 42 is limited by the position of the pointer 34.

In the actual operation of the camera, the light reflected from the subject to be photographed enters the photographic device 33 and generates a current in the galvanometer G and swings the pointer 34 to a predetermined position. The member 36 is then manually moved to the desired diaphragm opening which regulates the amount of energy in the galvanometer through the resistance coil 35, which in turn causes the pointer 34 to swing from its former position to a new position governed by the added factor of diaphragm opening, at which position it comes to rest. It is noted that the stepped member 42 is mounted above the pointer 34 and is so designed that in its downwardly movement, as above described, the pointer 34 will act as a stop member to limit the further downward movement of the stepped member 42 by engaging a notch 42a corresponding to the aforesaid resting position of the pointer 34. The number of steps or notches in the member 42 is made to correspond to the number of fixed shutter speeds of the camera.

The operation of the button 50 for exposing the film will now be described. When the button is initially pushed downwardly to cause the downward movement of the member 42 through the chain of gears, a rotatably mounted cam 51 (see Fig. 5) cooperating with a detent 52a integral with and extending horizontally away from a resilient arm 52 attached to the button for movement therewith, will temporarily lock the button 50 in its initial downward movement at a predetermined point. In such last named position, the notch 42a of the stepped member 42 immediately above the pointer 34 will rest upon said pointer and be prevented from further downward movement. Upon continued downward movement of the button 50, a pivotally mounted member 53 having an arm 53a disposed in the path of movement of the flange 50a of the button 50 and having a bifurcated arm 53b encircling a collar 54 attached to the shaft 25 will cause pivotal movement of the member 53 in a counterclockwise direction, which in turn will slidably move the said collar 54 laterally in the direction of the arrow A. Attached to the collar 54 is a part 55 of a clutch member which cooperates with a corresponding clutch member part 56 mounted on the shaft 45. When the clutch part 55 is moved by the pivotal movement of the member 53, it will separate from the clutch part 56. The cam 51 and the arm 52 will in the meantime hold the member 42 in its down position resting upon the pointer 34. Also attached to the collar 54 and to the shaft 25 for rotation therewith is a clutch part 60 adapted to cooperate with the clutch part 30. The said clutch part 30 is provided with a plurality of circumferentially disposed openings 61, each opening corresponding to a notch in the stepped member 42, which in turn corresponds to a predetermined shutter speed. Mounted on the clutch part 60 is a projecting pin 62 designed to be selectively received in one of the openings 61. Thus, it is seen that when the button 50 is pushed downwardly to rotate the gears 46 and 44, the clutch part 60 will correspondingly be rotated. When the stepped member 42 reaches its lowermost position against the pointer 34, the pin 62 of the clutch part 60 will at that time be disposed in direct alignment with an opening 61 corresponding to a predetermined shutter speed.

When the button 50 is depressed below the position in which the resilient arm 52 is temporarily locked in the rotatably mounted cam 51, the arm 52 will swing back towards the bracket 47a and on the upstroke of the button 50 the arm 52 will pass between the cam 51 and the bracket 47a. At this time the cam 51 will rotate in a counterclockwise direction, as viewed from Fig. 5, against the action of the spring 51a, and after said arm is clear of the cam 51 the cam will return to its normal position (shown in Fig. 5).

It is noted that the movement of the clutch part 55 away from its corresponding clutch part 56 will cause the pin 62 to enter the said corresponding opening 61. At the same time a projecting portion 60a of the clutch part 60 will force the member 31 out of the path of the lug 32 against the action of the spring 63 to permit the unitary rotational movement of the interclutched parts 30 and 60, together with the shaft 25 due to the action of the spring 26. When the shaft 25 is thus rotated, the shutter trip mechanism will be actuated to operate the shutter in the usual manner of shutter operation.

When an operator of the camera desires to take a picture, following standard practice, he may place the light-sensitive device 33 a short distance away from that portion of the subject which must be correctly exposed. He then observes the reading of the pointer 70 through the window 72 and adjusts the diaphragm setting point 39 according to his judgment. This will vary the resistance in the galvanometer circuit and compensate the automatically adjusted angular position of the arm 34 with respect to the stepped cam 42. While the operator is still holding the light-sensitive device 33 in proper position, he partially depresses the button 50. Such action causes the bottom light spring (Fig. 5) to compress and allows the rack 48 to move downwardly. At the same time, a corresponding downward movement will be imparted to the rack 43 and cam 42. At a point of its downward travel one of the steps of the cam 42, corresponding to the proper shutter timing, will strike the galvanometer arm 34 and lock the arm in adjusted position. However, the button 50, even though the racks 43 and 48 have stopped, will continue to move downwardly at such time against the action of the upper and stronger spring shown in Fig. 5.

While the button 50 is being depressed, the detent 52a on the resilient arm 52 is moved downwardly. During the latter part of its travel, said detent will strike the outer sloped surface of the cam 51 (best shown in Fig. 5). As the button 50 continues to move downwardly, the detent will ride over the high point of the cam which is approximately opposite its pivot point, and then will spring inwardly into the dwell shown at the lower portion of the cam.

It should be noted that the various parts of the camera are so dimensioned that by the time the detent has reached the lower dwell or ledge, the step cam 42 will already have abutted against the galvanometer needle 34 and the shutter elements will thus have been properly adjusted. If now manual pressure is removed from the button 50, it will not be able to spring back since the detent on the resilient arm 52 will be maintained in the dwell of the cam 51, thus keeping the shutter elements in their adjusted position in which they have been automatically set in accordance with prevailing light conditions.

The operator of the camera may now back away from the subject so as to include in the picture the desired amount of background. He also then focuses the camera. Finally, the button 50 is fully depressed to render the shutter operative. At this time the detent on the resilient arm 52 will clear the lowermost node on the cam 51 and spring to the right hand side of said cam (viewed from Fig. 5). When manual pressure is now removed from the button 50 and the detent urged upwardly, said detent will pass the uppermost part of the cam, causing the cam to turn slightly counterclockwise to permit its passage, and as soon as the detent clears the cam, the cam will return to the position shown in Fig. 5.

It will be noted that after the button 50 has been depressed a distance sufficient to enable a stop to abut the galvanometer arm 34, the shoulder 50a on the button will cause the mechanism which has set the angular adjustment of the elements 30 and 60 to become disconnected from the element 60 by disengagement of the clutch parts 55 and 56. This latter feature is extremely important in the operation of a focal plane shutter, since if the automatically controlled means which set the elements in accordance with prevailing light conditions were not disconnected from the shutter during operation thereof, it would be necessary to rotate said means with the shutter. Such rotation would be highly detrimental to the delicate automatic control.

As noted in Fig. 6, a switch S is provided which may be mounted on the camera casing to control the energization of the circuit from the light sensitive device 33 through the galvanometer G, so that before using the camera the switch S must be closed in order to permit actuation of the light sensitive device 33.

Since, as above described, the pointer 34 is attached to the galvanometer within the camera casing, the position at which it stops is not visible from the outside. We have, therefore, provided a second pointer 70 (see Fig. 1) mounted on the same shaft 40 and in alignment with the pointer 34. An opening 71 may be provided in the casing wall 11, underneath which is mounted a glass plate 72 covering the opening 71 and so positioned that the pointer 70 is visible from the outside of the camera. Suitable markings may be provided on the glass plate 72 to indicate the position at which the pointers 34 and 70 have come to rest.

In Figs. 7 and 8 of the drawings, we have shown a modified form of our invention which is characterized by the fact that the light sensitive control devices for mechanically and automatically setting the camera in accordance with prevailing light conditions is constructed as a single unit which is adapted to be attached to standard types of cameras on the market. The principle of operation of this modified form of our invention is the same as that described in connection with the Figs. 1 to 6 form and comprises a unitary housing 70 which is adapted to be attached to the shutter housing of a camera having a movable or extensible shutter housing. The frame of the housing 70 comprises a pair of ring portions 71 and 72 forming the tracks 73 and 74 therebetween. In the track 73 there is slidably mounted an arcuate shaped member 75 having stepped or notched portions 76 corresponding to the steps or notches of the member 42 and in conformity with the fixed shutter speeds of the camera. A suitable light sensitive device such as a photo-electric cell 77 is supported in the housing 70, as shown, and is electrically connected to a galvanometer 78, which is provided with a movably mounted indicating pointer 79 having a portion 79a thereof overhanging the notches of the stepped member 75. A resistance 80 is mounted in the channel 74, such resistance being similar in construction and function to the resistance 35, and a manually manipulative pointer member 81 is employed for selectively setting the diaphragm openings which at the same time automatically adjusts the amount of resistance utilized to effect the operation and ultimate positioning of the pointer 79. In the channel 73 there is provided a plunger member 82 fixed to a slidable member 82a, which has attached thereto an operating button or lever 83 projecting outwardly of the frame 70. One end of the plunger 82 is connected to the member 75 by a spring 84. The usual type of shutter trip lever 85 is also mounted on the frame 70. The operation of this device is similar to the operation of the apparatus shown in Figs. 1 to 6, namely when the photo-electric cell 77 is placed in operation by the closing of a switch similar to the switch S, the energy from the photo-electric cell transferred to the galvanometer 78 will cause the pointer 79 to move in accordance with prevailing light conditions. At the same time, the manual setting of the diaphragm opening by movement of the member 81 will correspondingly alter the position of the pointer 79 in accordance with the proportional amount of resistance, so that it will come to rest in accordance with the prevailing light conditions and in accordance with the predetermined size of diaphragm opening.

The camera is now ready for picture taking and the operator moves the button 83 in the direction of the arrow B which causes the member 75 to slidably move in the track 73 due to the interconnecting spring 84, until a specific notch 76 comes into abutting contact with the pointer end 79a, where it will stop. Such stopping position will be the proper shutter speed for the prevailing light conditions. At this point of movement of the button 83, a cam catch mechanism 90 is employed which is similar in construction, operation and function to the cam 51 and which serves to temporarily hold the plate 75 against movement back to its original position. The continued movement of the button 83 in the direction of the arrow B will ultimately cause the plunger 82 to actuate the shutter trip lever 85, to thus take the picture. Upon release of button 83, the spring 86 which is stronger than the spring 84 will restore the plate 75 and button 83 to their original positions. If desired, an indicating member 87 may be mounted on the plate 75 for movement therewith, for manual operation of the shutter speed setting, instead of using the above described automatic setting arrangement. A window 88 may be provided in the frame 70 disposed directly above the dial member 89, so that the position at which the pointer 79 comes to rest may be noted through the said window 88.

Suitable supporting guards 79b may be provided for preventing bending or disalignment of the pointer portion 79a when contactively engaged by the selected step 76.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. In a camera of the character described having a shutter driven through two relatively rotatable elements which rotate together during operation of said shutter and which are movable relative to each other along their axis of rotation, means to simultaneously rotate said elements, means to render said shutter operative, automatically controlled means to rotate one of said elements relative to the other of said elements in accordance with prevailing light conditions, said last named means including a clutch, said clutch being constructed and arranged so as to be engaged prior to operation of said shutter and to be disengaged during operation of said shutter, and means actuated by the means for rendering said shutter operative to move said clutch member so as to permit said clutch to remain engaged and said members to be spaced away from each other along their axis of rotation before said shutter is rendered operative and to disengage said clutch and place said elements in juxtaposition when said shutter is rendered operative.

2. In a camera of the character described having a shutter driven through two relatively rotatable elements which are rotatable together and which are movable relative to each other along their axis of rotation, means to render said shutter operative, means to simultaneously rotate said elements, automatically controlled means to vary the relative angular position of said elements in accordance with prevailing light conditions, said last named means including a clutch, means to lock said automatic means in adjusted position prior to operation of said shutter, means to maintain said automatic means locked until said shutter has been operated, means to free said automatic means after said shutter has been operated, and means actuated by the means for rendering said shutter operative to permit said clutch to remain engaged and said members to be spaced away from each other along their axis of rotation before said shutter is rendered operative, and to disengage said clutch and place said elements in juxtaposition when said shutter is rendered operative.

3. In a camera of the character described having an adjustable light control system including a shutter and means to trip the shutter, the combination of a manually manipulatable member accessible from the exterior of said camera, means including a light-sensitive device for setting said system in a position according with prevailing light conditions, said means being actuated upon manipulation of said member, and means to temporarily hold said system in set position after said member has been released and until the shutter has been tripped.

4. In a camera of the character described having an adjustable light control system including a shutter and means to trip the shutter, the combination of a manually manipulatable member accessible from the exterior of said camera, means including a light-sensitive device for setting said system in a position according with prevailing light conditions, said means being actuated upon manipulation of said member, means to temporarily hold said system in set position after said member has been released and until the shutter has been tripped, and means to render said holding means ineffective.

5. In a camera of the character described having an adjustable light control system including a shutter, the combination of a manually manipulatable member accessible from the exterior of said camera, means including a light-sensitive device for setting said system in a position according with prevailing light conditions, said means being actuated upon manipulation of said member, means to temporarily hold said system in set position after said member has been released, means to trip said shutter, and means effective after actuation of said shutter tripping means to render said holding means ineffective.

6. In a camera of the character described having an adjustable light control system including a shutter, the combination of manually manipulatable means to operate said shutter, means including a light-sensitive device for setting said system in a position according with prevailing light conditions, said setting means being actuated by said shutter operating means prior to tripping of said shutter, and means to temporarily hold said system in set position when said shutter operating means is released prior to tripping of said shutter and maintain said system in such set position until the shutter is tripped.

7. In a camera of the character described having an adjustable light control system including a shutter, the combination of manually manipulatable means to operate said shutter, means including a light-sensitive device for setting said system in a position according with prevailing light conditions, said setting means being actuated by said shutter operating means prior to tripping of said shutter, means to temporarily hold said system in set position when said shutter operating means is released prior to tripping of said shutter, and means effective after tripping of said shutter to render said holding means ineffective.

8. In a camera of the character described having an adjustable speed shutter, the combination of manually manipulatable means to operate said shutter, means including a light-sensitive device for setting said shutter at a speed according with prevailing light conditions, said setting means being actuated by said shutter operating means prior to tripping of said shutter, means to temporarily hold said shutter at its set speed when said shutter operating means is released prior to tripping of said shutter, and means to render said holding means ineffective subsequent to tripping of said shutter.

9. In a camera of the character described having an adjustable speed shutter, the combination of manually manipulatable means to operate said shutter, said means being operable between a normally inactive position and a shutter tripping position, means including a light-sensitive device for setting said shutter at a speed according with prevailing light conditions, said setting means being actuated by said shutter operating means before said shutter operating means reaches its actuating position, means to temporarily hold said shutter at its set speed when said shutter operating means is released without having reached actuating position, and means to render said holding means ineffective after said shutter operating means has reached its actuating position.

10. In a camera of the character described having an adjustable speed shutter, the combination of manually manipulatable means to operate said shutter, means including a light-sensitive device for setting said shutter at a speed according with prevailing light conditions, said setting means being actuated by said shutter operating means, and means for holding said shutter operating means against retrograde movement after said shutter has been set and until said shutter operating means has been further moved to trip said shutter.

11. In a camera of the character described having an adjustable speed shutter, the combination of manually manipulatable means to operate said shutter, means including a light-sensitive device for setting said shutter at a speed according with prevailing light conditions, said setting means being actuated by said shutter operating means, and means for holding said shutter operating means against retrograde movement after said setting means has been set and until said shutter operating means has been further moved to trip said shutter.

12. In a camera of the character described having an adjustable speed shutter and an adjustable diaphragm, the combination of manually manipulatable means for adjusting said diaphragm, manually manipulatable means to operate said shutter, means including a light-sensitive device for setting said shutter at a speed according with prevailing light conditions and the setting of said diaphragm, said setting means being actuated by said shutter operating means, and means for holding said shutter operating means against retrograde movement after said setting means has been set and until said shutter operating means has been further moved to trip said shutter.

13. A unit adapted to be attached to a camera having an adjustable light control system including a shutter and means to trip the shutter, said unit comprising the combination of a manually manipulatable member, means including a light-sensitive device for setting said system in a position according with prevailing light conditions, said means being actuated upon manipulation of said member, and means to temporarily hold said system in set position after said member has been relased and until the shutter has been tripped.

14. A unit adapted to be attached to a camera having an adjustable light control system including a shutter and means to trip the shutter, said unit comprising the combination of a manually manipulatable member, means including a light-sensitive device for setting said system in a position according with prevailing light conditions, said means being actuated upon manipulation of said member, means to temporarily hold said system in set position after said member has been released and until the shutter has been tripped, and means to render said holding means ineffective.

15. A unit adapted to be attached to a camera having an adjustable light control system including a shutter, said unit comprising the combination of a manually manipulatable member for operating said shutter, means including a light-sensitive device for setting said system in a position according with prevailing light conditions, said setting means being actuated by said shutter operating means prior to tripping of said shutter, and means to temporarily hold said system in set position when said shutter operating means is released prior to tripping of said shutter and maintain said system in such set position until the shutter is tripped.

16. A unit adapted to be attached to a camera having an adjustable speed shutter, said unit comprising the combination of manually manipulatable means for operating said shutter, means including a light-sensitive device for setting said shutter at a speed according with prevailing light conditions, said setting means being actuated by said shutter operating means prior to tripping of said shutter, means to temporarily hold said shutter at its set speed when said shutter operating means is released prior to tripping of said shutter, and means to render said holding means ineffective subsequent to tripping of said shutter.

17. A unit adapted to be attached to a camera having an adjustable speed shutter, said unit comprising the combination of manually manipulatable means for operating said shutter, means including a light-sensitive device for setting said shutter at a speed according with prevailing light conditions, said setting means being actuated by said shutter operating means, and means for holding said shutter operating means against retrograde movement after said shutter has been set and until said shutter operating means has been further moved to trip said shutter.

18. A unit adapted to be attached to a camera having an adjustable speed shutter, said unit comprising the combination of manually manipulatable means for operating said shutter, means including a light-sensitive device for setting said shutter at a speed according with prevailing light conditions, said setting means being actuated by said shutter operating means, and means for holding said shutter operating means against retrograde movement after said setting means has been set and until said shutter operating means has been further moved to trip said shutter.

19. A unit adapted to be attached to a camera having an adjustable speed shutter and an adjustable diaphragm, said unit comprising the combination of manually manipulatable means for operating said shutter, manually manipulatable means for adjusting said diaphragm, means including a light-sensitive device for setting said shutter at a speed according with prevailing light conditions and the setting of said diaphragm, said setting means being actuated by said shutter operating means, and means for holding said shutter operating means against retrograde movement after said setting means has been set and until said shutter operating means has been further moved to trip said shutter.

20. In a camera of the character described having an adjustable speed shutter and means to trip the shutter, the combination of a rotatable shaft adapted to drive the shutter upon actuation of said tripping means, an element mounted for rotation with said shaft, a second element mounted for rotation relative to said shaft, means to cause said second element to rotate with said shaft when said shutter is tripped, automatically controlled means to rotate said second element relative to said first element, whereby to adjust the speed of the shutter, in accordance with prevailing light conditions, said last named means including a driving train and means to break said driving train, and means to time the operation of said tripping means, said driving train, and said means for breaking said driving train so that said driving train is connected while said second element is being rotated relative to said shaft prior to tripping of said shutter and that said driving train is broken when said second element rotates with said shaft after tripping of said shutter.

21. In a camera of the character described having an adjustable speed shutter and means to trip the shutter, the combination of a rotatable shaft adapted to drive the shutter upon actuation of said tripping means, an element mounted for rotation with said shaft, a second element mounted for rotation relative to said shaft, means to cause said second element to rotate with said shaft when said shutter is tripped, automatically controlled means to rotate said second element relative to said first element, whereby to adjust the speed of the shutter, in accordance with prevailing light conditions, said last named means including a clutch and means to disengage said clutch, and means to time the operation of said tripping means, said clutch, and said means for disengaging said clutch so that said clutch is engaged while said second element is being rotated relative to said shaft prior to tripping of said shutter and that said clutch is disengaged when said second element rotates with said shaft after tripping of said shutter.

MEYER H. AXLER.
EDWARD HALITSKY.